United States Patent
Achanta

(10) Patent No.: US 9,590,411 B2
(45) Date of Patent: Mar. 7, 2017

(54) SYSTEMS AND METHODS FOR TIME SYNCHRONIZATION OF IEDS VIA RADIO LINK

(75) Inventor: Shankar V. Achanta, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 1262 days.

(21) Appl. No.: 13/327,531

(22) Filed: Dec. 15, 2011

(65) Prior Publication Data

US 2013/0157593 A1 Jun. 20, 2013

(51) Int. Cl.
H04B 7/00 (2006.01)
H04B 15/00 (2006.01)
H02H 1/00 (2006.01)
H04J 3/06 (2006.01)

(52) U.S. Cl.
CPC ......... *H02H 1/0061* (2013.01); *H04J 3/0638* (2013.01); *H04J 3/0667* (2013.01)

(58) Field of Classification Search
None
See application file for complete search history.

(56) References Cited

U.S. PATENT DOCUMENTS

| | | |
|---|---|---|
| 5,160,926 A | 11/1992 | Schweitzer, III |
| 5,537,143 A | 7/1996 | Steingold |
| 5,557,284 A | 9/1996 | Hartman |
| 5,737,715 A | 4/1998 | Deaton |
| 5,995,911 A | 11/1999 | Hart |
| 6,061,573 A | 5/2000 | Goldberg |
| 6,144,334 A | 11/2000 | Claffey |
| 6,229,479 B1 | 5/2001 | Kozlov |

(Continued)

FOREIGN PATENT DOCUMENTS

| | | |
|---|---|---|
| WO | 9747987 | 12/1997 |
| WO | 00/16525 | 3/2000 |

(Continued)

OTHER PUBLICATIONS

North American SynchroPhasor Initiative (NASPI), Performance & Standards Task Team (PSTT), Guidelines for Synchronization Techniques Accuracy and Availability, Dec. 30, 2008.

(Continued)

*Primary Examiner* — Tuan A Tran
(74) *Attorney, Agent, or Firm* — Jared L. Cherry; Richard M. Edge

(57) ABSTRACT

The present disclosure provides systems and methods for synchronizing the time signals of master and remote IEDs using a radio link. According to one embodiment, a master IED may transmit an adjusted time signal to a remote IED via a radio signal. The master IED may determine a propagation delay between the master IED and a remote IED. The master IED may then adjust a master time signal by the propagation delay and transmit the adjusted time signal to the remote IED. Alternatively, a remote IED may request and receive a master time signal from a master IED via a radio signal. The remote IED may then determine the propagation delay and adjust the received master time signal accordingly. According to various embodiments, the time signal of a master and remote IED may be synchronized to within at least one millisecond.

14 Claims, 10 Drawing Sheets

(56) References Cited

U.S. PATENT DOCUMENTS

| | | | |
|---|---|---|---|
| 6,388,997 B1* | 5/2002 | Scott | 370/280 |
| 6,463,049 B1* | 10/2002 | Abe et al. | 370/347 |
| 6,483,856 B1 | 11/2002 | Bird | |
| 6,940,931 B2 | 9/2005 | Ito | |
| 6,999,440 B2* | 2/2006 | Abe et al. | 370/335 |
| 7,146,516 B2 | 12/2006 | Dhupar | |
| 7,170,884 B1 | 1/2007 | Radimirsch | |
| 7,174,258 B2 | 2/2007 | Hart | |
| 7,266,713 B2 | 9/2007 | Lienhart | |
| 7,272,201 B2 | 9/2007 | Whitehead | |
| 7,363,009 B2* | 4/2008 | Erlenbach et al. | 455/67.11 |
| 7,375,683 B2 | 5/2008 | Smith | |
| 7,398,411 B2 | 7/2008 | Zweigle | |
| 7,436,232 B2 | 10/2008 | Sivero | |
| 7,440,427 B1 | 10/2008 | Katz | |
| 7,573,913 B2* | 8/2009 | Terry | 370/509 |
| 7,577,220 B2 | 8/2009 | Becker | |
| 7,616,682 B2* | 11/2009 | Small | 375/220 |
| 7,617,408 B2 | 11/2009 | Frazier | |
| 7,714,735 B2 | 5/2010 | Rockwell | |
| 7,746,269 B2 | 6/2010 | Kamimura | |
| 7,940,213 B2 | 5/2011 | Harper | |
| 7,952,519 B1 | 5/2011 | Nielsen | |
| 7,978,130 B1 | 7/2011 | Cohen | |
| 7,979,228 B2 | 7/2011 | Zurbuchen | |
| 7,986,270 B2 | 7/2011 | Heidari-Bateni | |
| 8,055,288 B2 | 11/2011 | Ladd | |
| 8,082,367 B2 | 12/2011 | Etheridge | |
| 8,138,972 B2 | 3/2012 | Underbrink | |
| 8,145,247 B2* | 3/2012 | Fullam | 455/502 |
| 8,159,391 B2 | 4/2012 | Papadimitratos | |
| 8,237,609 B2 | 8/2012 | Talbot | |
| 8,325,087 B2 | 12/2012 | Thomson | |
| 8,326,319 B2 | 12/2012 | Davis | |
| 8,446,896 B2 | 5/2013 | Bedrosian | |
| 8,564,330 B1 | 10/2013 | Radulov | |
| 8,655,608 B2 | 2/2014 | Guzman-Casillas | |
| 8,712,244 B2* | 4/2014 | Hasegawa et al. | 398/102 |
| 9,083,503 B2 | 7/2015 | Sagen | |
| 2001/0023464 A1 | 9/2001 | Deck | |
| 2002/0158693 A1 | 10/2002 | Soong | |
| 2003/0084190 A1* | 5/2003 | Kimball | 709/248 |
| 2003/0087654 A1 | 5/2003 | Wheeler | |
| 2004/0062279 A1 | 4/2004 | Primrose | |
| 2004/0228368 A1 | 11/2004 | Jecmen | |
| 2006/0259806 A1 | 11/2006 | Zweigle | |
| 2007/0132773 A1 | 6/2007 | Plante | |
| 2007/0194987 A1 | 8/2007 | Fedora | |
| 2008/0169978 A1 | 7/2008 | Powell | |
| 2008/0186229 A1 | 8/2008 | Van Diggelen | |
| 2008/0198069 A1 | 8/2008 | Gronemeyer | |
| 2009/0117928 A1 | 5/2009 | Ladd | |
| 2009/0160705 A1 | 6/2009 | Matsuzaki | |
| 2009/0310570 A1 | 12/2009 | Smith | |
| 2009/0315764 A1 | 12/2009 | Cohen | |
| 2010/0030916 A1 | 2/2010 | Greenwood Graham | |
| 2010/0034190 A1 | 2/2010 | Yun | |
| 2010/0073228 A1 | 3/2010 | Smith | |
| 2010/0117899 A1 | 5/2010 | Papadimitratos | |
| 2010/0190509 A1 | 7/2010 | Davis | |
| 2010/0222068 A1 | 9/2010 | Gaal | |
| 2010/0231448 A1 | 9/2010 | Harper | |
| 2010/0253578 A1 | 10/2010 | Mantovani | |
| 2010/0254225 A1 | 10/2010 | Schweitzer, III | |
| 2011/0001668 A1 | 1/2011 | Cobb | |
| 2011/0035066 A1 | 2/2011 | Schweitzer | |
| 2011/0068973 A1 | 3/2011 | Humphreys | |
| 2011/0085540 A1 | 4/2011 | Kuwabara | |
| 2011/0102258 A1 | 5/2011 | Underbrink | |
| 2011/0102259 A1 | 5/2011 | Ledvina | |
| 2011/0169577 A1 | 7/2011 | Nicholls | |
| 2011/0181466 A1 | 7/2011 | Serrano | |
| 2011/0227787 A1 | 9/2011 | Gum | |
| 2011/0261917 A1 | 10/2011 | Bedrosian | |
| 2011/0285586 A1 | 11/2011 | Ferguson | |
| 2012/0005326 A1 | 1/2012 | Bradetich | |
| 2012/0026037 A1 | 2/2012 | Thomson | |
| 2012/0030495 A1 | 2/2012 | Chandhoke | |
| 2012/0066418 A1 | 3/2012 | Foster | |
| 2012/0179404 A1 | 7/2012 | Lee | |
| 2012/0182181 A1 | 7/2012 | Dai | |
| 2012/0195253 A1 | 8/2012 | Irvine | |
| 2012/0195350 A1 | 8/2012 | Das | |
| 2012/0323397 A1 | 12/2012 | Schweitzer, III | |
| 2013/0157593 A1 | 6/2013 | Achanta | |
| 2013/0244624 A1 | 9/2013 | Das | |
| 2013/0328606 A1 | 12/2013 | Ravi | |
| 2013/0335266 A1 | 12/2013 | Vollath | |
| 2014/0003199 A1 | 1/2014 | Dougan | |
| 2014/0094218 A1 | 4/2014 | Hammes | |
| 2014/0100702 A1 | 4/2014 | Schweitzer | |
| 2014/0334477 A1 | 11/2014 | Stahlin | |

FOREIGN PATENT DOCUMENTS

| | | |
|---|---|---|
| WO | 0016525 | 3/2000 |
| WO | 2012151006 | 11/2012 |
| WO | 2014005016 | 1/2014 |

OTHER PUBLICATIONS

D. Mills, Network Working Group, Request for Comments 4330, Simple Network Time Protocol (SNTP) Version 4 for IPv4, IPv6, and OSI, Jan. 2006.

PCT/US2012/068915 Patent Cooperation Treaty, International Search Report and Written Opinion of the International Searching Authority, Mar. 26, 2013.

PCT/US2013/064942 Patent Cooperation Treaty, International Search Report and Written Opinion of the International Searching Authority, Jan. 29, 2014.

Tippenhauer, N.O., Popper, C., Rasmussen, K.B., Capkun, S., On the Requirements for Successful GPS Spoofing Attacks, In Proceedings of the ACM Conference on Computer and Communications Security (CCS), Oct. 2011.

Moore, P., Crossley, P., GPS Applications in Power Systems Part 1 Introduction to GPS, Tutorial: GPS in Power Systems, Power Engineering Journal, Feb. 1999.

Jafamia-Jahromi, A., Broumandan, A., Nielsen, J., Lachapelle, G., "GPS Vulnerability to Spoofing Threats and a Review of Antispoofing Techniques", International Journal of Navigation and Observation vol. 2012, Article ID 127072, Feb. 2012.

Wullems, C., "A Spoofing Detection Method for Civilian L1 GPS and the E1-B Galileo Safety of Life Service". IEEE Transactions on Aerospace and Electronic Systems, Aug. 2011.

Wen, H., Huang, P. Y., Dyer, J., Archinal, A., Fagan, J., "Countermeasures for GPS Signal Spoofing," Proceedings of the 18th International Technical Meeting of the Satellite Division of the Institute of Navigation (ION GNSS 2005), Long Beach, CA, Sep. 2005, pp. 1285-1290.

Gurtner, W., Estey, L., "Rinex: The Receiver Independent Exchange Format Version 3.00", Nov. 28, 2007.

Gurtner, W., "Rinex: The Receiver Independent Exchange Format Version 2", Sep. 2008.

PCT/US2013/064012, Patent Cooperation Treaty, International Search Report and Written Opinion of the International Searching Authority, Dec. 19, 2013.

PCT/US2013/065447, Patent Cooperation Treaty, International Search Report and Written Opinion of the International Searching Authority, Mar. 13, 2014.

PCT/US2014/010507 Patent Cooperation Treaty, International Search Report and Written Opinion of the International Searching Authority, May 6, 2014.

Shepard, D., Humphreys, T., Fansler, A., "Evaluation of the Vulnerability of Phasor Measurement Units to GPS Spoofing Attacks", Oct. 2, 2011.

PCT/US2014/010422 Patent Cooperation Treaty, International Search Report and Written Opinion of the International Searching Authority, Sep. 16, 2014.

(56) References Cited

OTHER PUBLICATIONS

PCT/US2014/034358 Patent Cooperation Treaty, International Search Report and Written Opinion of the International Searching Authority, Sep. 22, 2014.
PCT/US2014/049813 Patent Cooperation Treaty, International Search Report and Written Opinion of the International Searching Authority, Apr. 2, 2015.
PCT/US2015/024000 Patent Cooperation Treaty, International Search Report and Written Opinion of the International Searching Authority, Jul. 13, 2015.
PCT/US2015/029939 Patent Cooperation Treaty, International Search Report and Written Opinion of the International Searching Authority, Aug. 12, 2015.

* cited by examiner

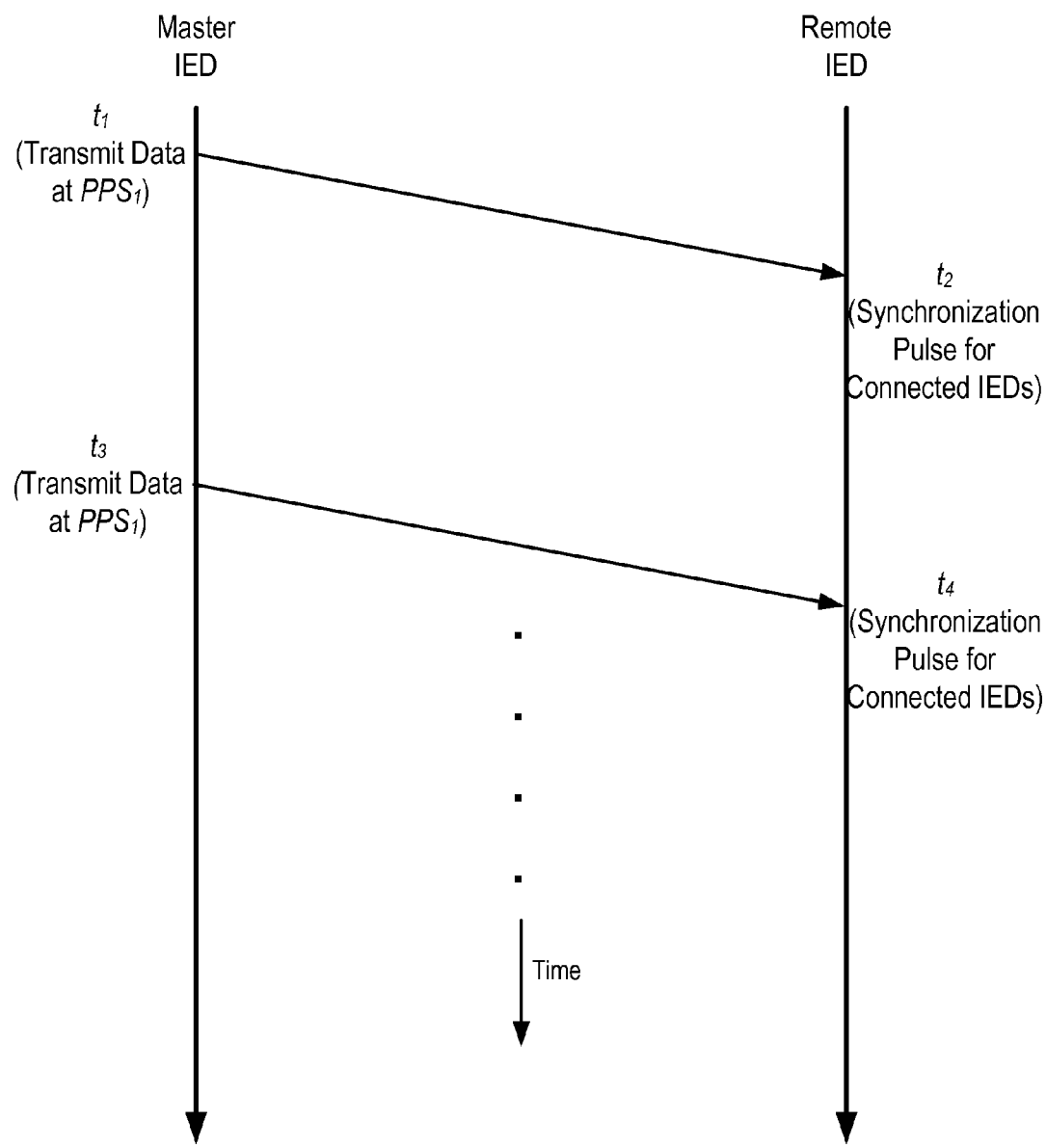

SYSTEMS AND METHODS FOR TIME SYNCHRONIZATION OF IEDS VIA RADIO LINK

TECHNICAL FIELD

This disclosure relates to time synchronization of intelligent electronic devices. More particularly, this disclosure relates to time synchronization of intelligent electronic devices via a radio signal.

BRIEF DESCRIPTION OF THE DRAWINGS

Non-limiting and non-exhaustive embodiments of the disclosure are described, including various embodiments of the disclosure with reference to the figures, in which:

FIG. 3C illustrates a diagram of an embodiment of the synchronization of a remote IED with a master IED via a radio signal transmitted at a known time such as a pulse-per second (PPS).

Figure 1:
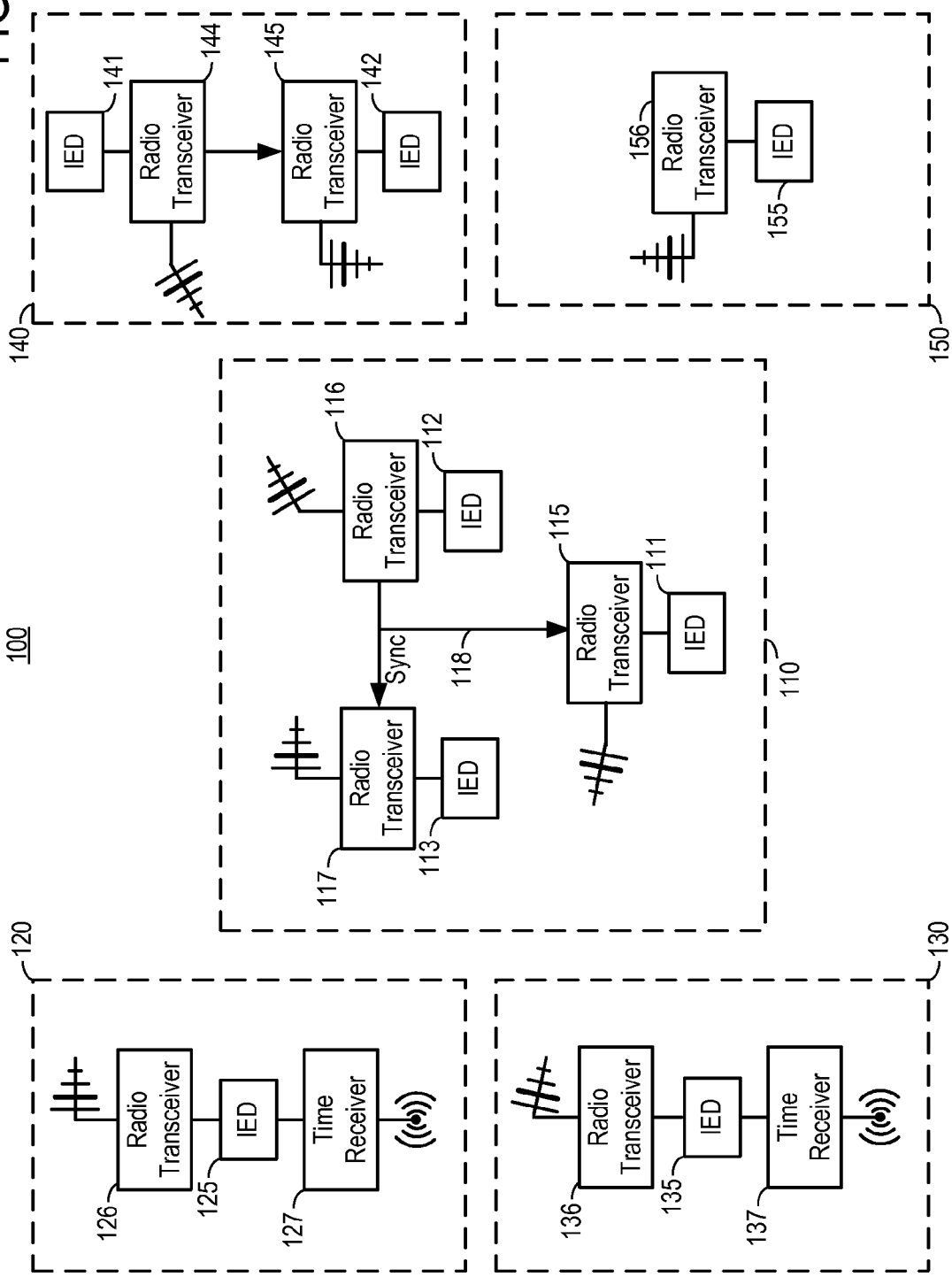
FIG. 1 illustrates an embodiment of a network of intelligent electronic devices (IEDs) in communication with one another via radio links and/or via direct connections.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Intelligent electronic devices (IEDs) may be used for monitoring, protecting and/or controlling industrial and utility equipment, such as in electric power delivery systems. Such systems may utilize accurate time information to perform various monitoring and protection tasks. IEDs within a power system may be configured to perform metering, control, and protection functions that require a certain level of precision between one or more IEDs. For example, IEDs may be configured to calculate and communicate time-synchronized phasors (synchrophasors), which may require that the IEDs be synchronized to within microseconds of one other. Many protection, metering, control, and automation algorithms used in power systems may benefit from or require synchronized time stamps on data transmitted between a plurality of IEDs.

Various systems may be used to distribute accurate time information between networked IEDs. According to various embodiments, a plurality of IEDs may maintain synchronized time signals using a synchronized optical network (SONET). In such an embodiment, accurate time information may be distributed using a synchronous transport protocol and synchronous transport modules (STMs). According to such embodiments, each synchronized IED must be physically connected to the SONET.

According to other embodiments, accurate time information may be communicated between networked IEDs using the precision time protocol (PTP), a global positioning system (GPS), and/or, with less accuracy, network time protocol (NTP). PTP and NTP traditionally utilize wired connections. A GPS synchronization scheme may require that each node have its own GPS receiver and that the GPS signal be accessible. The present disclosure provides various systems and methods for synchronizing the clocks of any number of IEDs using wireless radio links. According to various embodiments, the accuracy of time signal synchronization via a radio link may be in the sub-millisecond range.

According to various embodiments, an IED may utilize a radio link as a primary time source for maintaining a local clock synchronized with respect to other networked IEDs. Alternatively, an IED may utilize SONET, PTP, NTP, GPS as a primary independent time source for maintaining a local clock synchronized with respect to other networked IEDs. In such embodiments, a radio link may be used as a secondary time source to maintain synchronization in the event the primary independent time source is unavailable or compromised.

According to various embodiments, a substation or other remote location may not accommodate a wired connection and/or such a connection may be cost prohibitive. Remote IEDs within such a substation may communicate data related to monitoring, protecting, and/or controlling components in an electric power distribution system to master IEDs via a radio link. According to various embodiments, this same radio link may be utilized to maintain a remote IED's time signal synchronized with a time signal of a master IED.

The bandwidth available on a radio link may be limited and therefore may warrant a relatively low bandwidth method for time signal synchronization. According to one embodiment, a master IED determines the propagation delay between itself and a remote IED via a series of communication exchanges. The master IED may then transmit a master time signal adjusted for the calculated propagation delay to the remote IED. The remote IED may then synchronize its time signal with the master time signal. Alternatively, a remote IED may request a master time signal from a master IED and then determine the propagation delay based on when the response is received. The remote IED may then synchronize its time signal with respect to the master time signal.

In another embodiment, remote IEDs may synchronize their time signal with a master IED using the transmit and receive phases of the master IED. For example, the master IED may transmit data via a radio link at a pulse per second (PPS) mark generated by a common time source such as a GPS source, WWV, WWVB, WWVH, or the like. In such an embodiment, the master IED may transmit data to the remote IED via a radio link on a PPS mark. The radio receiver of the remote IED may then generate a time pulse upon receipt of the data transmission, and send such time pulse to its associated IED. The receiving IED may then synchronize other local IEDs using the arrival time. Accordingly, since both remote and master IEDs know that data received via a radio link was originally transmitted on the last PPS mark, remote and master IEDs may be time-aligned as needed.

According to various embodiments, an IED may include a time signal synchronization module configured to receive and/or transmit radio signals. According to various embodiments, the time signal synchronization module may synchronize its internal time signal after selecting a best available time signal based on a pre-programmed selection order or through the use of an algorithm. The time synchronization module of an IED may utilize an IED-to-IED radio transceiver as a primary time source to synchronize its internal time signal. Alternatively, the IED-to-IED radio transceiver may be used as a failsafe or backup time source in the event a primary independent time source fails or becomes unavailable. For example, a time signal synchronization module may utilize a GPS receiver or an Inter-range Instrumentation Group (IRIG) time source receiver as a primary independent time source and rely on the IED-to-IED radio link only as a failsafe. The IED may then transmit time synchronization data to other IEDs using any number of protocols, including PTP, NTP, IRIG, and via radio link.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

As used herein, the term IED may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term IED may be used interchangeably to describe an individual IED or a system comprising multiple IEDs.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special purpose processing device, such as an ASIC, PAL, PLA, PLD, Field Programmable Gate Array, or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires". The network may encompass smaller networks and/or be connectable to other networks through a gateway or similar mechanism.

Aspects of certain embodiments described herein may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

A time source may be any device that is capable of tracking the passage of time. A variety of types of time sources are contemplated, including a voltage-controlled temperature compensated crystal oscillator (VCTCXO), a phase locked loop oscillator, a time locked loop oscillator, a rubidium oscillator, a cesium oscillator, a microelectromechanical device (MEM), and/or other device capable of tracking the passage of time.

A time signal is a representation of the time indicated by a time source. A time signal may be embodied as any form of communication for communicating time information. A wide variety of types of time signals are contemplated, including an IRIG protocol, a GPS signal, radio broadcast such as a National Institute of Science and Technology (NIST) broadcast (e.g., radio stations WWV, WWVB, and WWVH), a private radio broadcast and associated protocol, the IEEE 1588 protocol, a network time protocol (NTP) described in RFC 1305, a simple network time protocol (SNTP) described in RFC 2030, and/or another time transmission protocol or system.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

FIG. 1 illustrates an embodiment of a network 100 of intelligent electronic devices (IEDs) in communication with one another via radio links and/or via direct connections. According to the illustrated embodiment, remote substations 120, 130, 140, and 150 may be in communication with a control center 110. Control center 110 may include IEDs 111, 112, and 113 in communication with one another. IEDs 111, 112, and 113 may be configured to monitor, protect, and/or control components in an electric power delivery system. IEDs 111, 112, and 113 may be configured to communicate time-sensitive data with each other, such as synchrophasors. Accordingly, it may be important that the internal time signals of each IED 111, 112, and 113 are synchronized.

Any of a wide variety of systems and associated protocols may be used to maintain the synchronization of time signals of each of IEDs 111, 112, and 113. For example, IEDs 111, 112, and 113 may utilize SONET, PTP, GPS, and/or NTP as a primary independent time source to maintain the synchronization of each IED. According to another embodiment, IEDs 111, 112, and 113 may utilize a radio link to synchronize the remaining IEDs. Alternatively, IEDs 111, 112, and 113 may utilize SONET, PTP, NTP, and/or GPS as a primary independent time source and a radio link as a failsafe or backup system for maintaining time signal synchronization.

According to the illustrated embodiment, a radio transceiver 116 may be configured as a primary radio. Accordingly, primary radio transceiver 116 may transmit a master time signal 118 generated by IED 112. Master time signal 118 may be transmitted within control center 110 to radio transceiver 117 and radio transceiver 115. Radio transceivers 115 and 117 may utilize master time signal 118 to ensure that that IEDs 111 and 113 are synchronized with respect to IED 112.

Substation 120 may include an IED 125 in communication with a time receiver 127 (such as a receiver capable of receiving a common time signal such as GPS, WWV, WWVB, WWVH, a time signal common to the network, or the like) and a radio transceiver 126. Substation 120 may be geographically separated from control center 110. According to one embodiment, IED 125 may communicate with an IED in control center 110 via a wired connection (not illustrated), such as Ethernet or SONET. Alternatively, IED 125 may communicate with an IED in control center 110 via radio transceiver 126.

IED 125 may utilize time receiver 127 to receive an independent time source in order for IED 125 to maintain synchronization with respect to IEDs 111, 112, and 113 within control center 110. According to another embodiment, IED 125 may utilize radio transceiver 126 to receive a master time signal generated by a radio transceiver 115, 116, and/or 117 within control center 110.

According to some embodiments, highly accurate time signal synchronization is needed, such as for calculating synchrophasors. Accordingly, the radio link between radio transceiver 126 in remote substation 120 and a radio transceiver 115, 116, and/or 117 within control center 110 may utilize a training sequence to determine the propagation delay between IED 125 and an IED 111, 112, or 113 within control center 110. A received master time signal may then be adjusted to compensate for propagation and/or processing delays. Examples of suitable training sequences are described in greater detail below.

Substation 130 may include an IED 135 in communication with a time receiver 137 (such as a receiver capable of receiving a common time signal such as GPS, WWV, WWVB, WWVH, a time signal common to the network, or the like) and a radio transceiver 136. Substation 130 may be in communication with control center 110 via one or more wired connections and/or via radio transceiver 136. IED 135 may utilize time receiver 137 to receive an independent time signal. According to another embodiment, IED 135 may utilize radio transceiver 136 to receive a master time signal transmitted by a radio transceiver 115, 116, and/or 117 within control center 110. IED 135 may utilize a master time signal received by radio transceiver 136 as a primary time source or as a failsafe or backup time source for synchronizing its timing signal with those in control center 110.

Substation 140 may include IED 141 and IED 142 each in communication with a radio transceiver 144 and 145, respectively. IEDs 141 and 142 may maintain their respective time signals synchronized with a master time signal of an IED 111, 112, or 113 within control center 110. As illustrated, radio transceiver 144 may act as a local master radio transceiver within substation 140 by providing a time signal to radio transceiver 145. Using the time signal received by radio transceiver 145, IED 142 may maintain its internal time signal synchronized with respect to IED 141. In order to maintain substation 140 synchronized with respect to control center 110, radio transceiver 144 may receive a master time signal from a radio transceiver located within control center 110, such as one of radio transceivers 115, 116, or 117. Accordingly, radio transceiver 144 may act as a master radio transceiver within substation 140 and as a remote radio transceiver with respect to a radio transceiver 115, 116, or 117 within control center 110.

Substation 150 may include an IED 155 configured to synchronize its time signal with respect to control center 110 using a master time signal received by radio transceiver 156. Radio transceiver 156 may receive a master time signal from a radio transceiver located within control center 110, such as one of radio transceivers 115, 116, or 117. Alternatively, radio transceiver 156 may receive a master time signal from a radio transceiver located within substation 140, such as one of radio transceivers 144 and 145. In such an embodiment, IED 155 within substation 150 may be synchronized with IEDs 141 and 142 within substation 140, which are in turn synchronized with IEDs 111, 112, and 113 within control center 110. In each of the above embodiments, once IED 155 is synchronized, it may transmit accurate time-stamped data via a wire (not shown) or via radio transceiver 156 to an IED 111, 112, or 113 within control center 110.

Figure 2:
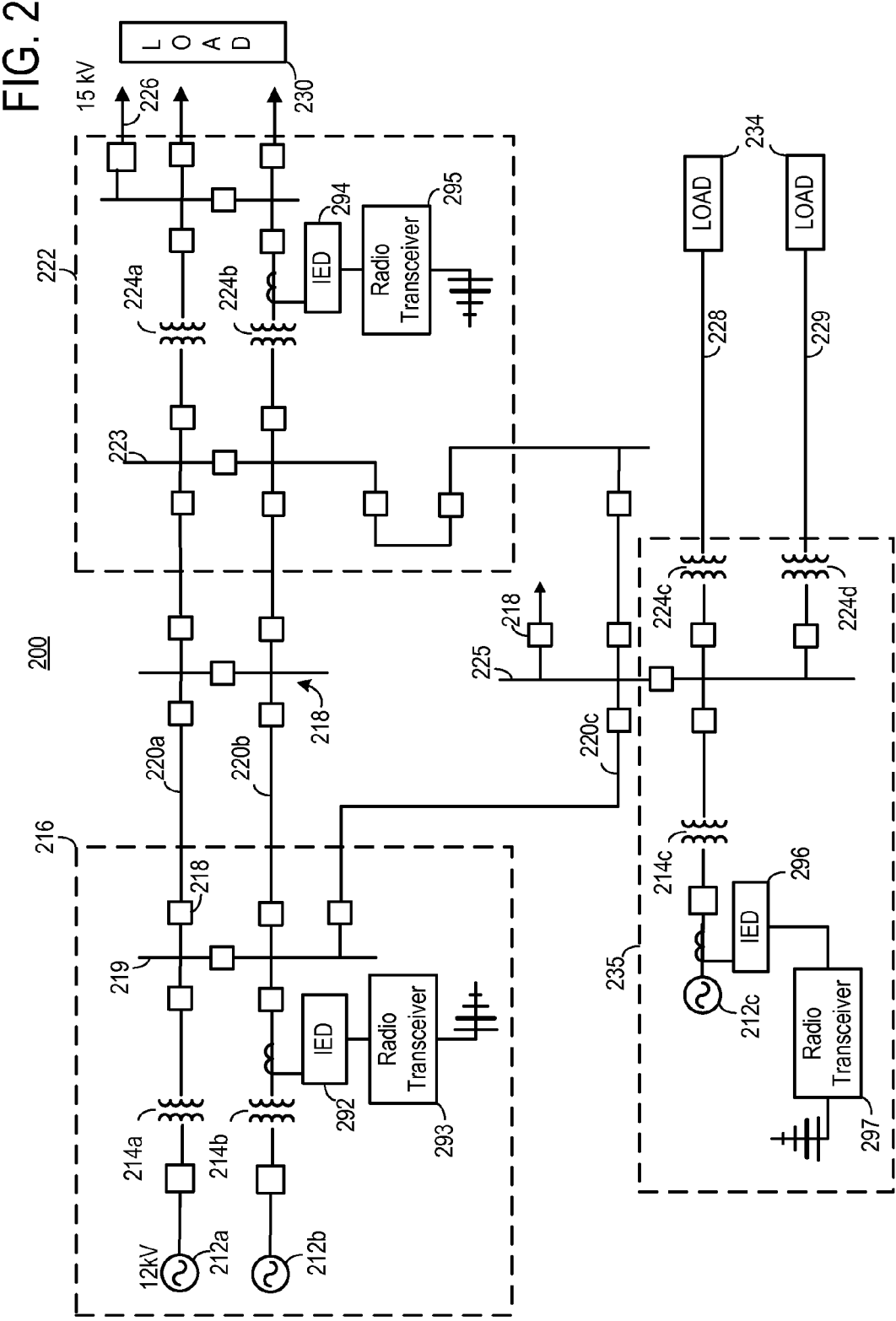
FIG. 2 illustrates a diagram of an embodiment of an electric power distribution system including IEDs connected to radio transceivers.

FIG. 2 illustrates a diagram of an electric power distribution system 200. Distribution system 200 includes intelligent electronic devices (IEDs) 292, 294, and 296 utilizing a common time signal to monitor, protect, and/or control system components. Electric power distribution system 200 includes three geographically separated substations 216, 222, and 235. Substations 216 and 235 include generators 212a, 212b, and 212c. The generators 212a, 212b, and 212c generate electric power at a relatively low voltage, such as 12 kV. The substations include step-up transformers 214a, 214b, and 214c to step up the voltage to a level appropriate for transmission. The substations include various breakers 218 and buses 219, 223, and 225 for proper transmission and distribution of the electric power. The electric power may be transmitted over long distances using various transmission lines 220a, 220b, and 220c. Substations 22 and 35 may include step-down transformers 224a, 224b, 224c, and 224d for stepping down the electric power to a level suitable for distribution to loads 230 and 234 using distribution lines 226, 228, and 229.

IEDs 292, 294, and 296 are configured to protect, control, meter and/or automate certain power system equipment or devices. According to several embodiments numerous IEDs are used in each substation; however, for clarity only a single IED at each substation is illustrated in FIG. 2. IEDs 292, 294, and 296 may be configured to perform various time dependant tasks including, but not limited to, monitoring and/or protecting a transmission line, distribution line, and/or a generator. Other IEDs included in a substation may be configured as bus protection relays, distance relays, communications processors, automation controllers, transformer protection relays, and the like. Each IED or group of IEDs may be configured to communicate on a local area network (LAN) or wide area network (WAN).

An IED may be configured to calculate and communicate synchrophasors with other IEDs. To accurately compare synchrophasors obtained by geographically separate IEDs, each IED may need to be synchronized with a common time signal with accuracy greater than a millisecond to allow for time-aligned comparisons. According to various embodiments, time synchronization, accurate to the microsecond or nanosecond range, may allow IEDs to perform accurate comparisons of synchrophasors.

Each of IEDs 292, 294 and 296 may be in communication with a radio transceiver 293, 295, and 297, respectively. One of radio transceivers 293, 295, and 297 may serve as a master radio transceiver and transmit a master time signal to the other two radio transceivers. IEDs 292, 294, and 296 may utilize the received master time signal to maintain their respective internal time signals synchronized. To maintain highly accurate synchronization, either the transmitting IED or the receiving IEDs may compensate for the propagation delay and/or processing delay of the time signal between the various radio transceivers.

According to some embodiments, the master time signal transmitted via radio transceivers 293, 295, and 297 may be used as a primary time source. Alternatively, the master time signal transmitted via radio transceivers 293, 295, and 297 may be a failsafe or backup time source to another system, such as a GPS or SONET system.

Figure 3A:
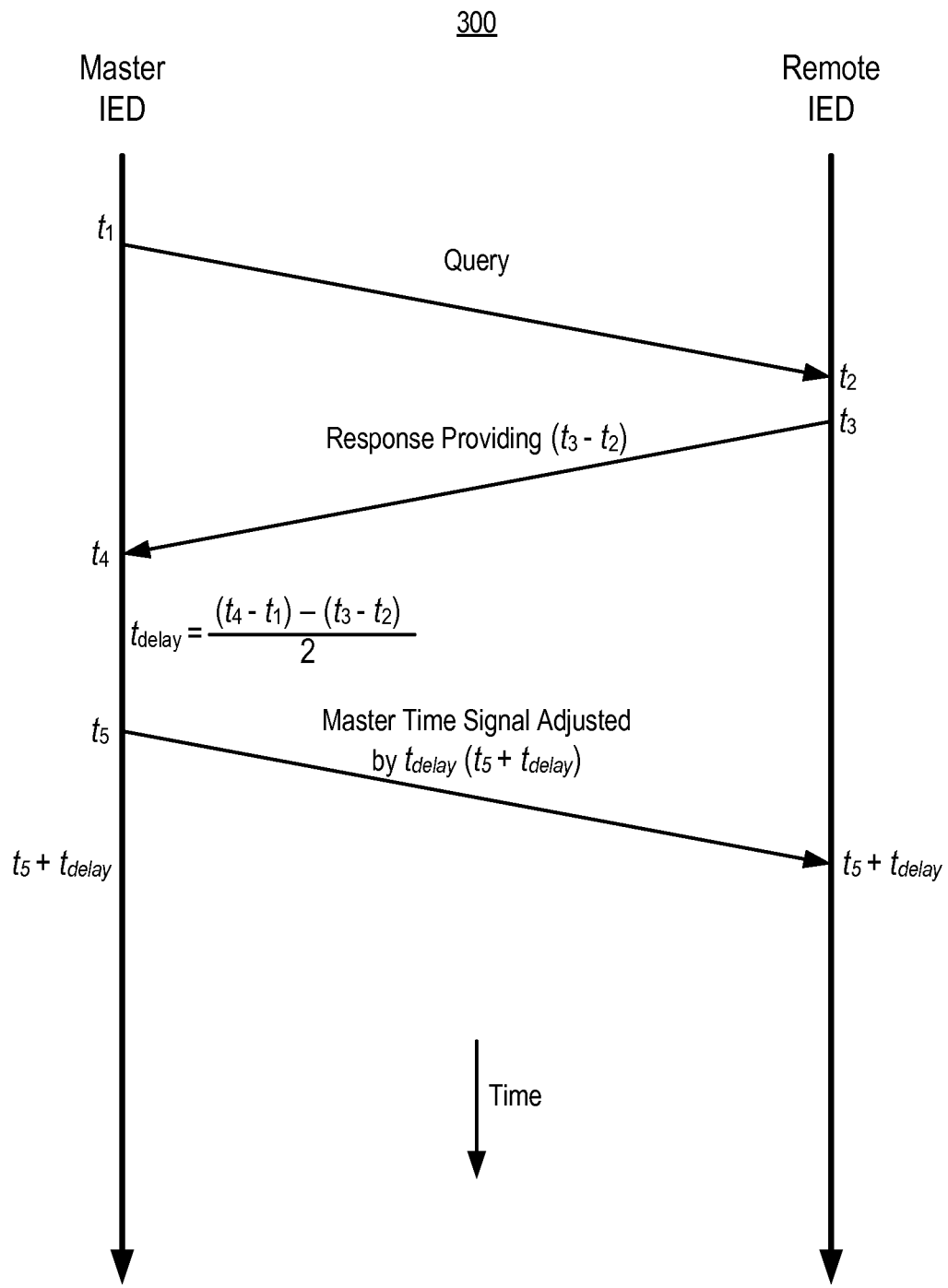
FIG. 3A illustrates a diagram of an embodiment of the synchronization of a remote IED with a master IED via a radio signal in which the master IED compensates for propagation and/or processing delays.

FIG. 3A illustrates a diagram 300 of one embodiment of the synchronization of a remote IED (right side) with a master IED (left side) via a radio signal, in which the master IED compensates for propagation and/or processing delays. A method for determining and then compensating for propagation delays and/or processing times may provide for highly accurate time synchronization over a radio link while minimizing the required bandwidth. Existing protocols, such as PTP and NTP may provide inadequate accuracy, not be readily adaptable to wireless radio transmissions, and/or consume significantly more bandwidth.

As illustrated, at time $t_1$ the master IED transmits a query via a radio link to the remote IED. The query may contain a request that the remote IED respond as quickly as possible. Due to the propagation delay of the radio signal, the remote IED receives the query at time $t_2$. The difference between $t_1$ and $t_2$ may depend on the distance between the master IED and the remote IED. The remote IED may respond at time $t_3$ with a response. The difference between $t_2$ and $t_3$ may represent the processing time it takes the remote IED to receive the request and provide a response. According to various embodiments, for increased accuracy, the response transmitted from the remote IED to the master IED may provide the master IED with the processing delay ($t_3-t_2$).

Once the response is received, at $t_4$, the master IED may calculate the propagation delay of a radio signal between the master IED and the remote IED. As illustrated, the propagation delay $t_{delay}$ may be calculated using the following equation:

$$t_{delay} = \frac{(t_4 - t_1) - (t_3 - t_2)}{2} \qquad \text{Equation 1}$$

In Equation 1, $t_{delay}$ is the propagation delay of the signal transmitted from the master IED to the remote IED. According to the embodiment illustrated in FIG. 3A, the propagation delay is equal to one half of the difference between when the time the response from the remote IED is received, $t_4$, and when the master IED transmitted the original query, $t_1$, less the processing delay ($t_3-t_2$) of the remote IED. Depending on the accuracy needed, in some embodiments, the processing delay may be omitted and/or approximated.

Once the propagation delay, $t_{delay}$, has been determined, the master IED may transmit an adjusted time signal to the remote IED. At time $t_5$, the master IED may transmit a command for the remote IED to set its time signal to a time equal to $t_5+t_{delay}$. Due to the propagation delay, the remote IED may receive the command to set its network clock to $t_5+t_{delay}$ at the correct time to synchronize its time signal with that of the master IED.

Figure 3B:
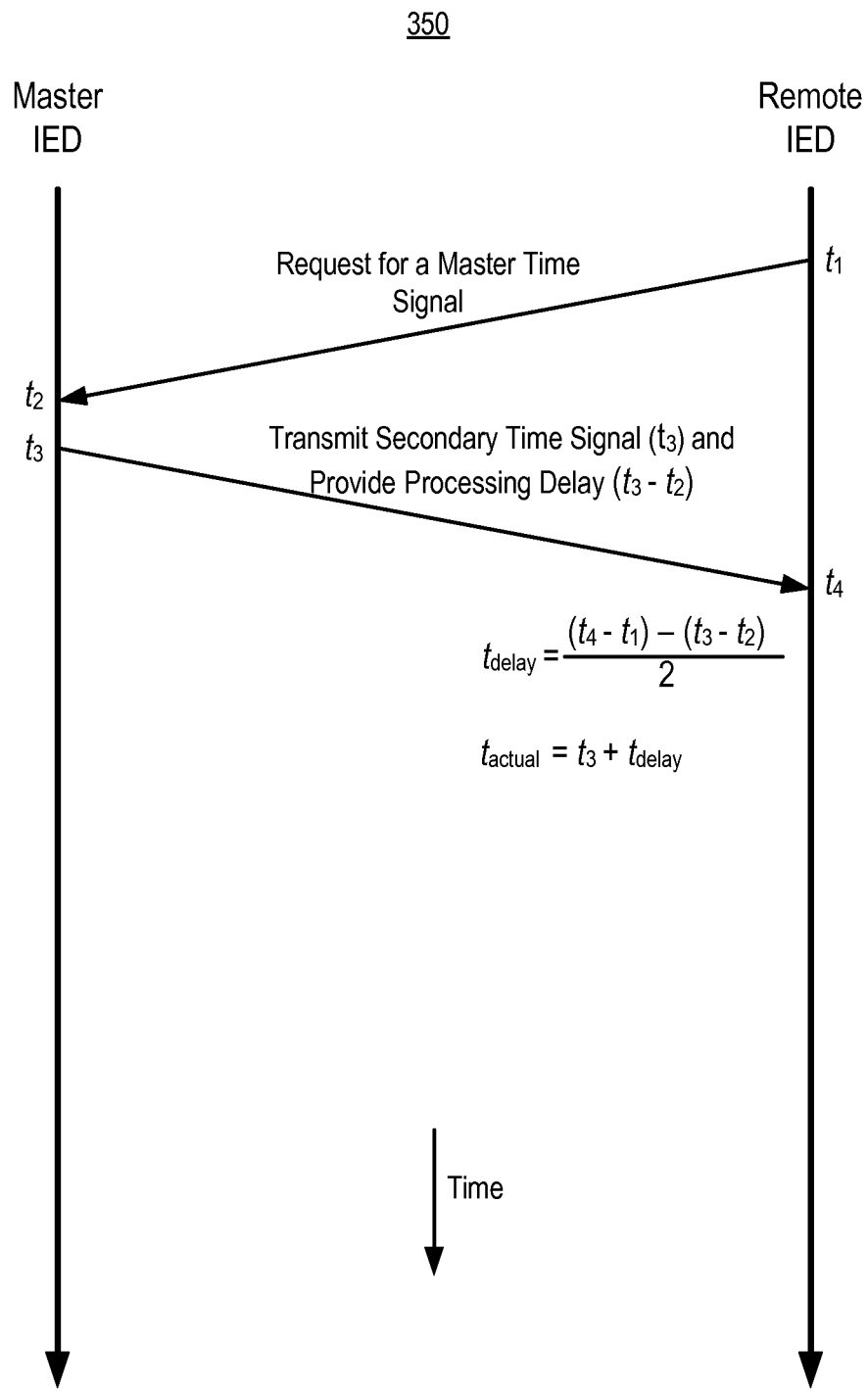
FIG. 3B illustrates a diagram of an embodiment of the synchronization of a remote IED with a master IED via a radio signal in which the remote IED compensates for propagation and/or processing delays.

FIG. 3B illustrates a diagram 350 of an embodiment of the synchronization of a remote IED (right side) with a master IED (left side) via a radio signal in which the remote IED compensates for propagation and/or processing delays. As illustrated, a remote IED may transmit a request for a secondary time signal via a radio transceiver at time $t_1$. Due to the propagation delay of the radio signal, master IED may receive the request at time $t_2$. At time $t_3$, the master IED may transmit the secondary time signal to the remote IED. Depending on the desired accuracy and significance of the processing time, the master IED may also transmit the processing time. The processing time may be the difference between when the master IED received the request for the secondary time signal and when it actually transmitted the secondary time signal, i.e. $(t_3-t_2)$. The remote IED may receive the secondary time signal (which the master IED indicated was $t_3$) after a propagation delay, $t_{delay}$. The remote IED may calculate the propagation delay using Equation 1 above.

At time $t_4$, the remote IED may synchronize its time signal with the actual time, $t_{actual}$, equal to $t_3+t_{delay}$. According to various embodiments, the remote IED may periodically communicate via a radio signal with the master IED in order to maintain synchronization. The remote IED may re-determine the propagation delay for each synchronization event, or it may rely on past determinations.

FIG. 3C illustrates a diagram 375 of an embodiment of the synchronization of a remote IED (right side) with a master IED (left side) via a radio signal in which the remote IED does not compensate for propagation and/or processing delays. As illustrated, the master IED is associated with a time receiver that receives a common time signal as described herein. The common time signal may provide a common time reference such as a pulse-per second (PPS). Alternatively, the master IED may use a time signal from the time receiver to create its own reference such as a PPS. The IED may provide a common time signal including a PPS to the radio transceiver. The radio transceiver may be configured to synchronize its transmit and receive phases with respect to the time signal received from the master IED and/or the time receiver. For example, the radio transceiver may be configured to always begin its transmission at a certain point in the time signal such as a PPS. Accordingly, the transmission will begin at $t_1$, the PPS of the common time signal. Upon receiving the transmission at $t_2$, the remote radio transceiver may be configured to provide a synchronizing pulse for its associated remote IED. Again at $t_3$ (upon the next PPS) the radio transceiver associated with the master IED begins its transmission, and upon receiving the transmission at $t_3$, the remote radio transceiver may be configured to provide a synchronizing pulse for its associated remote IED.

In one embodiment, the master and remote IEDs may have calculated a propagation delay from the master IED to the remote IED using, for example, a synchronization technique as illustrated in FIGS. 3A and/or 3B. The remote IED could then synchronize its internal time to that of the master IED using the PPS originating from the transmit time of the master IED and the known propagation delay. That is, $t_{actual}=t_2+t_{delay}$ (where $t_{delay}$ is calculated as illustrated in FIG. 3B).

Figure 4:
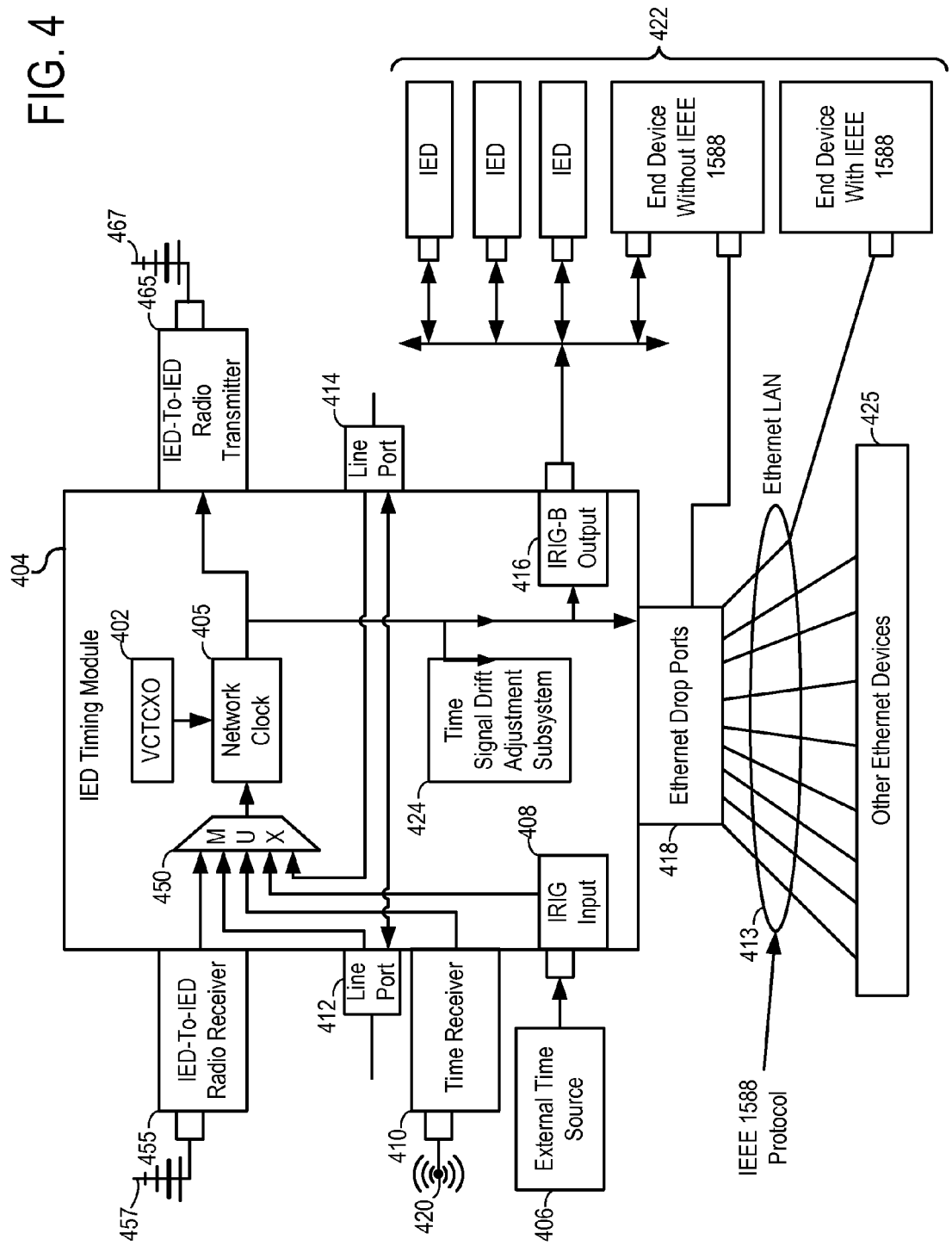
FIG. 4 illustrates a functional block diagram of an embodiment of an IED configured to receive, distribute, and/or determine a time signal.

FIG. 4 illustrates a functional block diagram of an embodiment of an IED timing module 404. IED timing module 404 may be configured to receive, distribute, and/or determine a common time signal. IED timing module 404 may include more or less functionality than the embodiment shown in FIG. 4. As illustrated, IED timing module 404 may include a local time source 402 that provides a local time signal and a network clock 405 for establishing a common time signal.

IED timing module 404 may include a pair of line ports 412 and 414 for communications with a WAN or LAN. Time information may be shared over a network and may also be fed into the network clock 405. Further, IED timing module 404 may include a time receiver 410 (such as a receiver capable of receiving a common time signal such as GPS, WWV, WWVB, WWVH, a time signal common to the network, or the like) for receiving a independent time signal from a common time system via an antenna 420 (such as capable of receiving a GPS signal, or other common time signal). The received independent time signal may also be communicated to the network clock 405. An additional external time source 406 may communicate with another time port such as an IRIG input 408. An IED-to-IED radio receiver 455 may be in communication with an antenna 457 configured to receive a time signal from another IED. An IED-to-IED radio transmitter 465 may be in communication with an antenna 467 configured to transmit a time signal to another IED. According to various embodiments, IED-to-IED radio receiver 455, IED-to-IED radio transmitter 465, and/or another component of IED timing module 404 may be configured to calculate a propagation delay of the radio signals transmitted to or received from another IED.

The various time information from the WAN (from line ports 412 and/or 414), time receiver 410, IRIG input 408, and IED-to-IED radio receiver 455 may be processed by a multiplexor (MUX) 450 before time information is presented to network clock 405. Network clock 405 functions to determine a common time signal for use by the various devices connected to IED timing module 404. Time information is then communicated from the network clock 405 to the various devices 422 using IRIG protocol (via the IRIG-B output 416) or to various devices 425 using another protocol 413 such as IEEE 1588 using Ethernet drop ports 418. The Ethernet drop ports 418 may also include network communications to the various devices connected to IED timing module 404.

IED timing module 404 may also comprise a time signal drift adjustment subsystem 424, which may be configured to track drift rates associated with various external time sources with respect to local time source 402. Time signal drift adjustment subsystem 424 may also generate a weighting factor for each of the plurality of time signals. Time signal drift adjustment subsystem 424 may also communicate time signals according to a variety of protocols. In various embodiments, time signal drift adjustment subsystem 424 may be implemented using a processor in communication with a computer-readable storage medium containing machine executable instructions. In other embodiments, time signal drift adjustment subsystem 424 may be embodied as hardware, such as an application-specific integrated circuit or a combination of hardware and software.

Figure 5:
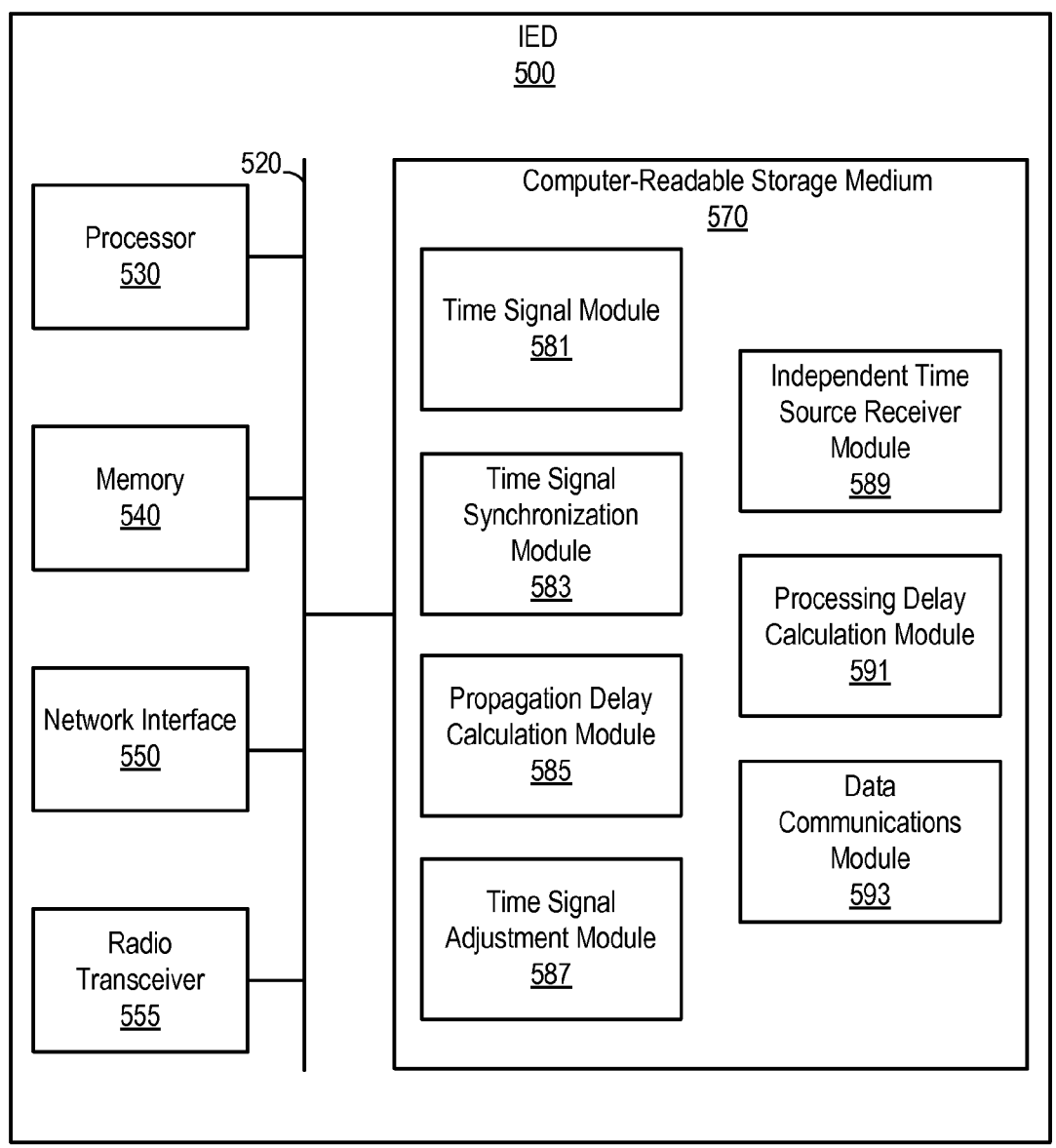
FIG. 5 illustrates an embodiment of a function block diagram of an IED configured to distribute and/or receive a time signal via a radio link.

FIG. 5 illustrates an embodiment of a function block diagram of an IED 500 configured to distribute and/or receive a common time signal via a radio link. As illustrated, IED 500 may include a processor 530, memory 540 (RAM), a network interface 550, and a radio transceiver 555 in communication with computer-readable storage medium 570 via bus 520. Computer-readable storage medium 570 may include one or more of modules 581-593 configured to allow for accurate time signal synchronization using a radio signal by accounting for the propagation delay of the radio signal. According to various embodiments, one or more of modules 581-593 may be implemented using firmware and/or hardware. According to various embodiments, the implementation of one or more of modules 581-593 as hardware and/or firmware may allow for increased accuracy. Additionally, one or more of software modules 581-593 may be combined as a single module and/or separated into a plurality of sub-modules.

According to various embodiments, a time signal module 581 may be configured to maintain a local time signal for IED 500. Accordingly, for a master IED, time signal module 581 may maintain a master time signal utilized by one or more remote IEDs to synchronize the remote IEDs' time signals. For a remote IED, time signal module 581 may be configured to maintain a local time signal used only by the remote IED and possibly synchronized with a master time signal of a master IED.

According to various embodiments, an independent time source receiver module 589 may be configured to receive an independent time signal trusted as providing an accurate global time signal. Remote IEDs and master IEDs may synchronize the time signal maintained by their respective time signal modules 581 with an independent time signal received by independent time receiver module 589. For example, independent time source receiver module 589 may be configured to receive a time signal from a global positioning system or other accurate time source. According to some embodiments, independent time source receiver module 589 may receive a time signal from a time source, such as a VCTCXO, a phase locked loop oscillator, a time locked loop oscillator, a rubidium oscillator, a cesium oscillator, a microelectromechanical device (MEM), and/or other device capable of tracking the passage of time.

Time signal synchronization module 583 may be configured to allow a master IED to transmit a radio signal requesting a response from a remote IED and receive a response after a time delay corresponding to the propagation delay between the two IEDs. Propagation delay calculation module 585 may then determine the propagation delay between the master IED and the remote IED. Time signal adjustment module 587 may then adjust the master time signal maintained by time signal module 581 and transmit the adjusted time signal to the remote IED. According to some embodiments, a processing delay calculation module 591 may be configured to account for the processing delay of the remote IED. The adjusted time signal may be further adjusted to account for the processing delay prior to transmission. According to some embodiments, processing delay calculation module 591 may utilize processing delay information provided to the master IED by the remote IED via a radio signal, pre-programmed processing delay information, and/or estimated processing delay information.

Alternatively, time signal synchronization module 583 may be configured to allow a remote IED to transmit a radio signal requesting a master time signal from a master IED. Time signal synchronization module 583 may then receive a master time signal from a master IED. Propagation delay calculation module 585 may then determine the propagation delay between the master IED and the remote IED. Time signal adjustment module 587 may be configured to adjust the received master time signal by the propagation delay and synchronize the local time signal with the adjusted time signal. According to some embodiments, a processing delay calculation module 591 may be configured to account for the processing delay of the master IED. The adjusted time signal may be further adjusted to account for the processing delay. According to some embodiments, processing delay calculation module 591 may utilize processing delay information provided to the remote IED by the master IED via a radio signal, pre-programmed processing delay information, and/or estimated processing delay information.

According to various embodiments, the radio transceivers used by master and remote IEDs may also be utilized to communicate data relating to an electric power distribution system. For example, data communications module 593 may be utilized to transfer data between two or more IEDs for metering, controlling, and/or protecting one or more components in an electric power distribution system.

Figure 6A:
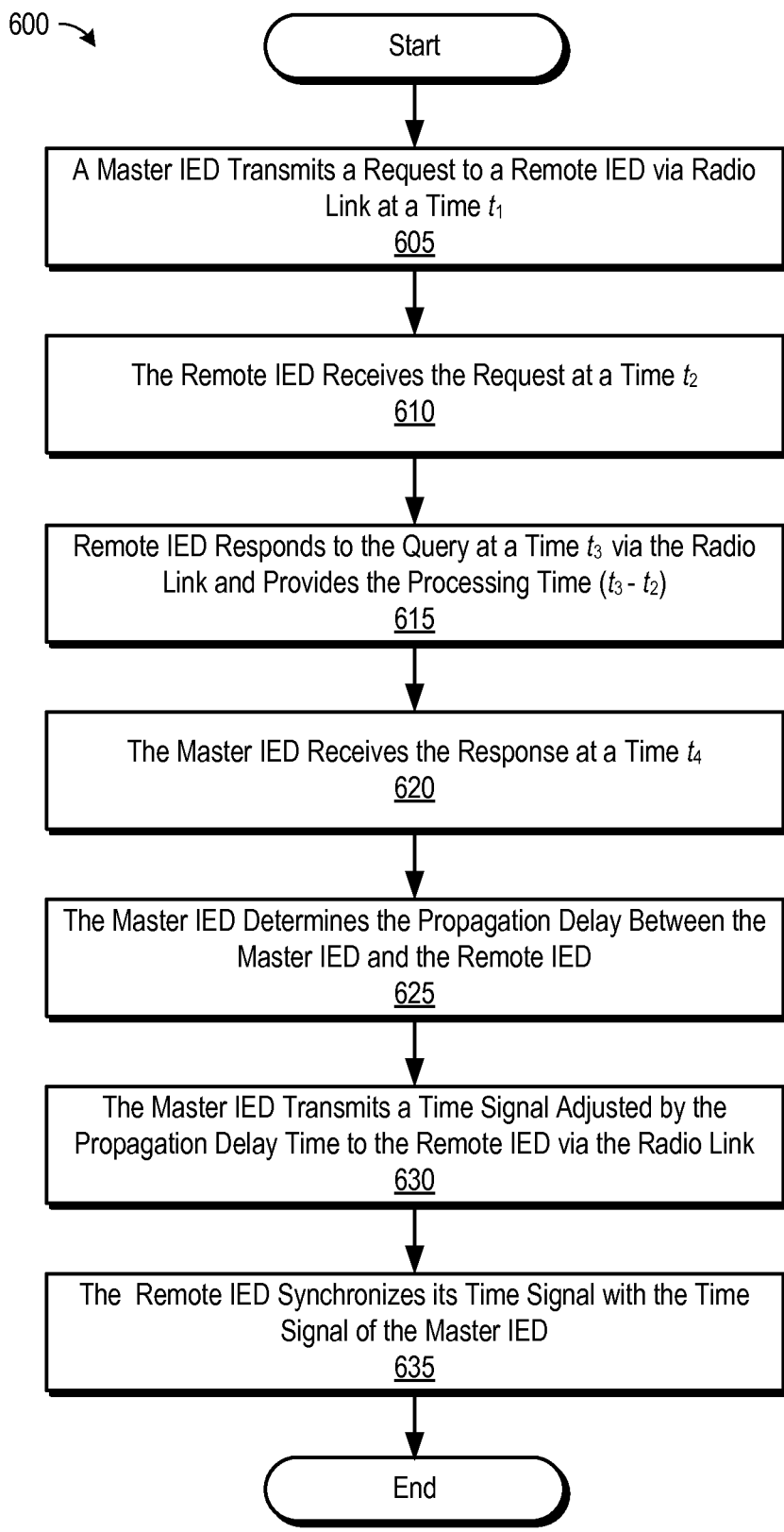
FIG. 6A illustrates a flow chart of an embodiment of a method for a master IED to transmit an adjusted time signal to a remote IED via a radio signal in order for the remote IED to synchronize its time signal with a time signal of a master IED.

FIG. 6A illustrates a flow chart of an embodiment of a method 600 for a master IED to transmit an adjusted time signal to a remote IED via a radio signal in order for the remote IED to synchronize its time signal with a time signal of the master IED. As illustrated, a master IED may transmit a request for a response to a remote IED via a radio link at a time $t_1$, at 605. Due to a propagation delay, the remote IED may receive the request at a time $t_2$, at 610. The remote IED may respond to the request at a time $t_3$ via the radio link and provides the processing time $(t_3-t_2)$, at 615. Due to the propagation delay, the master IED may receive the response at a time $t_4$, at 620

The master IED may then determine the propagation delay between the master IED and the remote IED using equation 1 above, at 625. The master IED may then transmit a time signal adjusted by the propagation delay time to the remote IED via the radio link, at 630. The remote IED may then synchronize its time signal with the time signal of the master IED using the adjusted time signal, at 635.

Figure 6B:
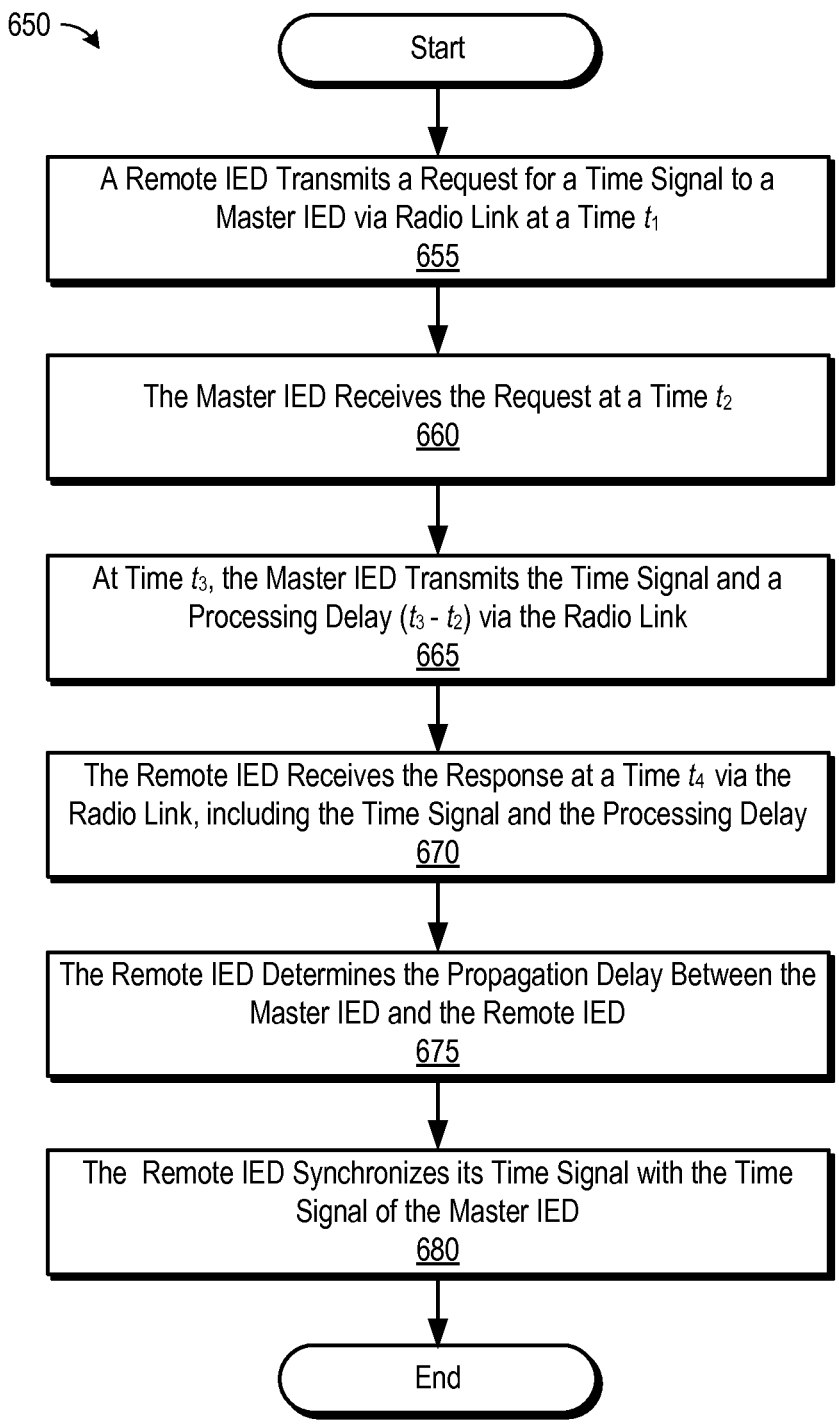
FIG. 6B illustrates a flow chart of an embodiment of a method for a remote IED to synchronize its time signal with a time signal of a master IED via a radio link.

FIG. 6B illustrates a flow chart of an embodiment of an alternative method 650 for a remote IED to synchronize its time signal with a time signal of a master IED via a radio link. As illustrated, a remote IED may transmit a request for a time signal to a master IED via radio link at a time $t_1$, at 655. The master IED may then receive the request at a time $t_2$, at 660. At time $t_3$, the master IED may transmit the time signal and a processing delay $(t_3-t_2)$ via the radio link to the remote IED, at 665. The remote IED may receive the response, including the time signal and the processing delay, at a time $t_4$ via the radio link, at 670. The remote IED may then determine the propagation delay between the master IED and the remote IED, at 675. The remote IED may then synchronize its time signal with the time signal of the master IED using the determined propagation delay, at 680.

Figure 7:
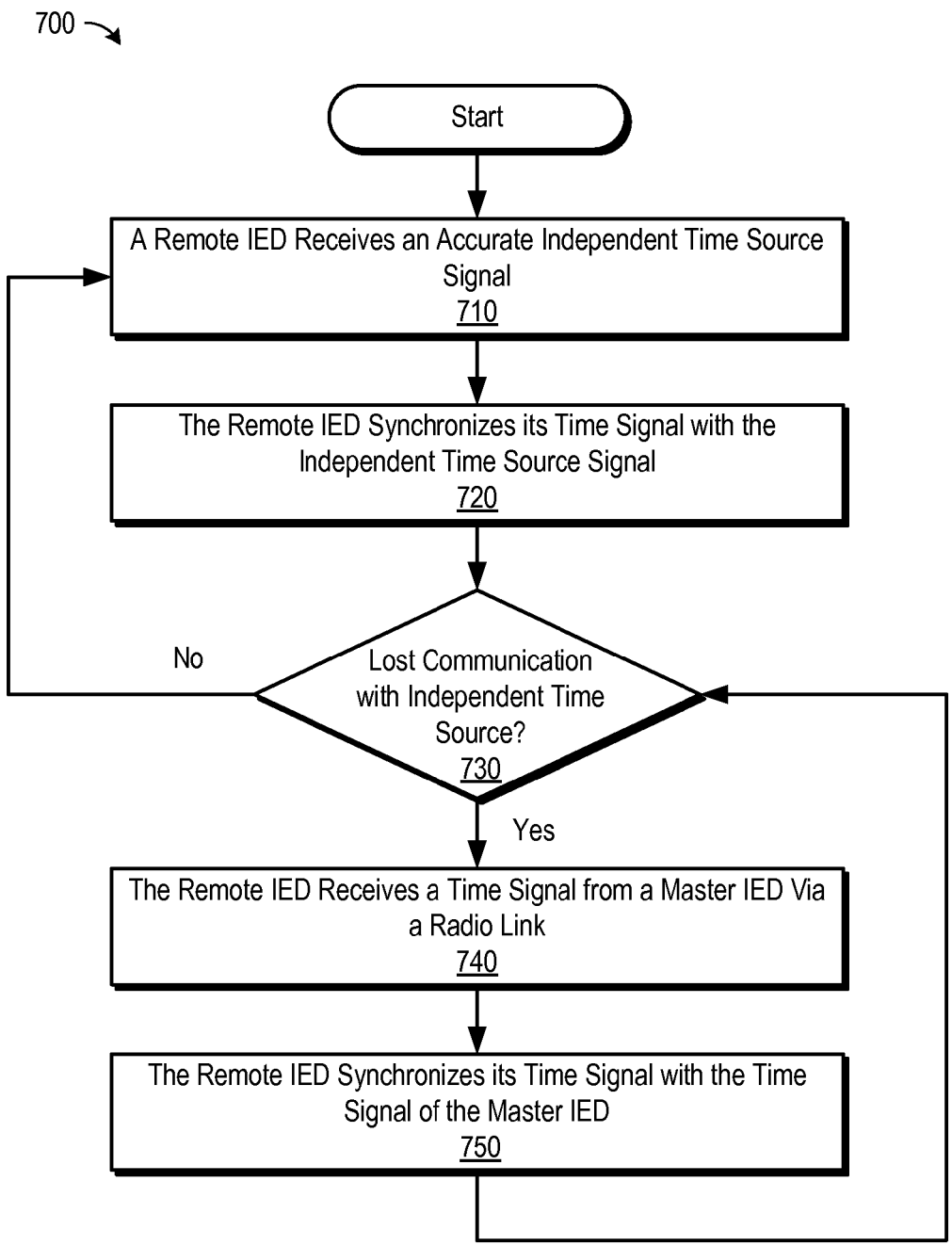
FIG. 7 illustrates a flow chart of an embodiment of a method of using a primary independent time source to synchronize a remote IED and using a secondary time source distributed via a radio link as a failsafe.

FIG. 7 illustrates a flow chart of an embodiment of a method 700 of using a primary independent time source to synchronize a remote IED and relying on a secondary time signal distributed via a radio link as a failsafe. A remote IED may receive an accurate independent time source signal, at 710. According to various embodiments, the remote IED may include an independent time source signal receiver configured to receive an independent time source signal from any of a wide variety of time sources, including a VCTCXO, a phase locked loop oscillator, a time locked loop oscillator, a rubidium oscillator, a cesium oscillator, a microelectromechanical device (MEM), and/or other device capable of tracking the passage of time. The remote IED may synchronize its time signal to the independent time source, at 720. The remote IED may periodically or continually check to see if it has lost communication with the independent time source, at 730. If the IED has not lost communication with the independent time source, at 730, then it may continue to synchronize its time signal with that of the independent time source.

If the remote IED loses communication with the independent time source, at 730, it may receive a time signal form a master IED via a radio link, at 740. The time signal received from the master IED may have already been adjusted to account for propagation delays and/or processing delays. Alternatively, the remote IED may adjust the received time signal to account for propagation and/or processing delays. Using the adjusted time signal, the remote IED may then synchronize its time signal with the time signal of the master IED, at 750.

The above description provides numerous specific details for a thorough understanding of the embodiments described herein. However, those of skill in the art will recognize that one or more of the specific details may be omitted, modified, and/or replaced by a similar process or system.

What is claimed:

1. An intelligent electronic device (IED) configured to transmit a time signal adjusted by a calculated propagation delay via a radio link, the IED comprising:
   a radio transmitter configured to transmit radio signals;
   a radio receiver configured to receive radio signals;
   a time signal module configured to maintain a master time signal;
   a time signal synchronization module in communication with the radio transmitter and the radio receiver, the time signal synchronization module configured to:
      transmit a radio signal to a receiving IED via the radio transmitter requesting a response; and
      receive the response from the receiving IED via the radio receiver after a first time delay;
   a propagation delay calculation module configured to determine a propagation delay associated with the response; and
   a time signal adjustment module configured to calculate a new time signal for the receiving IED, the new time signal representative of a time from the master time signal and adjusted by the propagation delay, and
   wherein the radio transmitter transmits the new time signal via the radio link to the receiving IED subsequent to a detection of loss of communication with a primary independent time source.

2. A method for synchronizing a first intelligent electronic device (IED) and a second IED, comprising the first IED:
   transmitting a radio signal to the second IED requesting a response from the second IED;
   receiving a response via a radio signal from the second IED after a first time delay;
   determining a propagation delay between the first IED and the second IED by dividing the first time delay in half;
   calculating a new time signal for the second IED, the new time signal representative of a time from a master time signal and adjusted by the propagation delay; and
   transmitting the new time signal for the second IED to the second IED via a radio signal in order for the second IED to synchronize a time signal of the second IED with the new time signal, subsequent to a detection of loss of communication with a primary independent time source.

3. The method of claim 2, wherein receiving a response from the second IED after a first time delay further comprises:
   receiving a response including a processing delay corresponding to the difference between when the second IED received the request from the first IED and when the second IED transmitted the response to the first IED; and
   wherein determining a propagation delay between the first IED and the second IED by dividing the first time delay in half further comprises:
   subtracting the processing delay from the first time delay prior to dividing the first time delay in half.

4. The method of claim 2, wherein the primary independent time source comprises a global positioning system.

5. The method of claim 2, further comprising the first IED transmitting data to the second IED via a radio signal, the data relating to the monitoring of at least one component in an electric power delivery system.

6. The method of claim 2, wherein the time signal of the first IED adjusted by the propagation delay transmitted to the second IED is configured to allow the second IED to synchronize the time signal of the second IED to the time signal of the first IED to within at least 1 millisecond.

7. An intelligent electronic device (IED) configured to transmit a time signal adjusted by a calculated propagation delay via a radio link, the IED comprising:
   a radio transmitter configured to transmit radio signals;
   a radio receiver configured to receive radio signals;
   a time signal module configured to maintain a master time signal;
   a time signal synchronization module in communication with the radio transmitter and the radio receiver, the time signal synchronization module configured to:
      transmit a radio signal to a receiving IED via the radio transmitter requesting a response; and
      receive the response from the receiving IED via the radio receiver after a first time delay;
   a propagation delay calculation module configured to determine a propagation delay associated with the response; and
   a time signal adjustment module configured calculate a new time signal for the receiving IED based upon the master time signal and the propagation delay, and
   wherein the radio transmitter transmits the new time signal via the radio link to the receiving IED subsequent to a detection of the loss of communication with a primary independent time source.

8. The IED of claim 7, further comprising a processor and a computer-readable storage medium in communication with the processor; and
   wherein the propagation delay calculation module and the time signal adjustment module comprise software modules within the computer-readable storage medium.

9. The IED of claim 7, further comprising an independent time source signal receiver module configured to receive an independent time signal and provide the independent time signal to the time signal module; and
   wherein the time signal module is configured to synchronize the master time signal with the independent time signal.

10. The IED of claim 9, wherein the independent time source signal receiver module is configured to receive an independent time signal from a global positioning system.

11. The IED of claim 7, wherein the time signal module comprises a time source configured to generate the master time signal.

12. The IED of claim 7, wherein the response received by the time signal synchronization module comprises a processing delay corresponding to the difference between when a second IED received the request for a response and when the second IED transmitted the response; and
   wherein determining a propagation delay associated with the response comprises subtracting the processing delay from the first time delay and dividing the difference in half.

13. The IED of claim 7, further comprising a data communications module configured to transmit data via the radio transmitter, the data relating to the monitoring of at least one component in an electric power delivery system.

14. The IED of claim 7, wherein the time signal adjustment module is configured to generate the adjusted time signal with sufficient accuracy to allow for time signal synchronization to within at least 1 millisecond.

* * * * *